United States Patent
Zheng

(10) Patent No.: US 9,160,862 B2
(45) Date of Patent: Oct. 13, 2015

(54) TELEPHONE CONFERENCE SYSTEM AND METHOD

(75) Inventor: Guorong Zheng, Guangdon (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/124,992

(22) PCT Filed: Mar. 16, 2012

(86) PCT No.: PCT/CN2012/072479
§ 371 (c)(1),
(2), (4) Date: Dec. 9, 2013

(87) PCT Pub. No.: WO2012/167643
PCT Pub. Date: Dec. 13, 2012

(65) Prior Publication Data
US 2014/0113605 A1    Apr. 24, 2014

(30) Foreign Application Priority Data
Jun. 9, 2011  (CN) .......................... 2011 1 0154372

(51) Int. Cl.
*H04M 3/42* (2006.01)
*H04M 3/56* (2006.01)
(Continued)

(52) U.S. Cl.
CPC ............ *H04M 3/56* (2013.01); *H04M 3/42374* (2013.01); *H04W 4/06* (2013.01); *H04W 4/16* (2013.01); *H04W 8/04* (2013.01); *H04W 76/00* (2013.01); *H04M 2203/5063* (2013.01)

(58) Field of Classification Search
None
See application file for complete search history.

(56) References Cited

U.S. PATENT DOCUMENTS 5,963,864 A * 10/1999 O'Neil et al. .................. 455/445
5,987,318 A   11/1999 Alperovich et al.
(Continued)

FOREIGN PATENT DOCUMENTS

CN   1231807 A   10/1999
CN   1859515 A   11/2006
(Continued)

OTHER PUBLICATIONS

International Search Report in international application No. PCT/CN2012/072479, mailed on May 24, 2012.
(Continued)

*Primary Examiner* — Marivelisse Santiago Cordero
*Assistant Examiner* — Moustapha Diaby
(74) *Attorney, Agent, or Firm* — LeClairRyan, a Professional Corporation

(57) ABSTRACT

A telephone conference system and method are disclosed. The system includes: a terminal state scanning module (2) configured to acquire one or more terminal numbers corresponding to a user who is supposed to participate in a conference, and acquire a terminal state corresponding to each of the one or more terminal numbers; and a service processing module (5) configured to select at beginning of conference establishment, according to a preset routing principle and the terminal state corresponding to the each of the one or more terminal numbers, a terminal number which meets a requirement from the one or more terminal numbers, and make a call to the selected terminal number. With the disclosure, a terminal number which meets a requirement from the one or more terminal numbers is selected according to a preset routing principle and a terminal state obtained by scanning and corresponding to one or more terminal numbers of a user who is supposed to participate in a conference, and a call is made to the selected terminal number. Since one or more terminal numbers corresponding to the user participating in the conference exist, the success rate of connecting a terminal number corresponding to the user is increased to a certain degree, thereby ensuring that the user can successfully participate in a telephone conference to a certain degree.

15 Claims, 5 Drawing Sheets

(51) Int. Cl.
*H04W 4/06* (2009.01)
*H04W 8/04* (2009.01)
*H04W 76/00* (2009.01)
*H04W 4/16* (2009.01)

(56) References Cited

U.S. PATENT DOCUMENTS

2004/0242225 A1* 12/2004 Wang .................... 455/432.1
2007/0081651 A1   4/2007 Iyer et al.
2007/0121866 A1   5/2007 Kniveton et al.

FOREIGN PATENT DOCUMENTS

| CN | 101242449 A | 8/2008 |
|---|---|---|
| CN | 101448195 A | 6/2009 |
| CN | 101616297 A | 12/2009 |
| CN | 101969513 A | 2/2011 |
| WO | 2007060286 A2 | 5/2007 |

OTHER PUBLICATIONS

English Translation of the Written Opinion of the International Search Authority in international application No. PCT/CN2012/072479, mailed on May 24, 2012.

Supplementary European Search Report in European application No. 12797536.5, mailed on Apr. 8, 2014.

* cited by examiner

TELEPHONE CONFERENCE SYSTEM AND METHOD

This application is a national stage application under 35 U.S.C. §371 from PCT Application No. PCT/CN2012/072479, filed Mar. 16, 2012, which claims the priority benefit of China Application No. 201110154372.6, filed Jun. 9, 2011.

TECHNICAL FIELD

The disclosure relates to the field of communication technology, and more particularly to a telephone conference system and method.

BACKGROUND

At present, telephone conferences, as a common means of communication, are playing an important role in an original telephone network application in many domestic industries due to respective characteristics of the industries. As a popular international office working way, a telephone conference system, which is cost-saving and time-saving with strong real-time performance and is not restricted by regions, is an important means for modern business, office work and management. Use of telephone conference systems greatly improves the working efficiency, management and competitiveness of enterprises.

However, existing telephone conference systems fail to satisfy changing market requirements as cross-regional activities of enterprises are carried out more and more broadly and the types of telephones used by users participating in conferences become increasingly rich.

Generally, a terminal number corresponding to a user participating in a conference is set in the application of a telephone conference system. When a telephone conference is initiated, a conference host calls the terminal number corresponding to the user participating in the conference to notify the user to participate in a telephone conference. The terminal number corresponding to the user may not be connected in such a design, thus the user who should participate in the conference fails to participate in the telephone conference. In addition, the conference host, who does not know the locations of all users participating in the conference when initiating the telephone conference, sets mobile terminal numbers as terminal numbers corresponding to all the users participating in the conference to facilitate contact, and calls the mobile terminal numbers to call all the users to participate in the telephone conference. However, there are still some problems in the method which the mobile terminal numbers of the users are called, for example, problems including an absence of a user in a conference due to a connection failure of a mobile terminal number, radiation caused to a user by a mobile terminal when the mobile terminal is used in a telephone conference for a long time after the number of the mobile terminal is called through, heating and overheating of the mobile terminal itself, and the like. Therefore, users tend to use fixed telephone terminals to participate in telephone conferences if permitted. However, a user participating in a conference may not be found in time by calling a fixed telephone terminal instead of calling a mobile terminal. Therefore, there are some disadvantages in related technologies, and practical demands of users participating in conferences cannot be satisfied.

SUMMARY

In view of this, a telephone conference system and method are provided according to embodiments of the disclosure, be capable of increasing the success rate of connecting a terminal number corresponding to a user participating in a conference.

To solve the technical problem above, the following technical solutions are applied in the embodiments of the disclosure.

A telephone conference system includes:

a terminal state scanning module configured to acquire one or more terminal numbers corresponding to a user who is supposed to participate in a conference, and acquire a terminal state corresponding to each of the one or more terminal numbers; and a service processing module configured to select at beginning of conference establishment, according to a preset routing principle and the terminal state corresponding to the each of the one or more terminal numbers, a terminal number which meets a requirement from the one or more terminal numbers, and make a call to the selected terminal number.

In an embodiment of the disclosure, the system may further include a conference management module configured to designate users who are supposed to participate in the conference.

In an embodiment of the disclosure, the terminal state corresponding to the each of the one or more terminal numbers may include at least one of followings: a power-on/power-off state of a mobile terminal, a roaming state of the mobile terminal, a registration location of a fixed telephone terminal, and a login/logout state of the fixed telephone terminal.

In an embodiment of the disclosure, the terminal state scanning module may be specifically configured to: interact with a Service Switching Point (SSP) of a bureau party to obtain the power-on/power-off state of the mobile terminal; interact with a Home Location Register (HLR) of the bureau party to obtain the roaming state of the mobile terminal; and interact with a Soft Switching Point (SSP) to obtain the registration location and the login/logout state of the fixed telephone terminal.

In an embodiment of the disclosure, the service processing module may include a terminal selecting unit and a calling unit, wherein the terminal selecting unit is configured to select, according to the preset routing principle and the terminal state corresponding to the each of the one or more terminal numbers, the terminal number which meets the requirement from the one or more terminal numbers, wherein the preset routing principle refers to that the fixed telephone terminal has precedence over the mobile terminal and/or that a local terminal number has precedence over a roaming terminal number; and wherein the calling unit is configured to call the selected terminal number meeting the requirement.

In an embodiment of the disclosure, the system may further include a setting module configured to, in the case the selected terminal number is a number of a mobile terminal and the mobile terminal is called through, set a candidate terminal according to a preset rule; and wherein, the service processing module is further configured to, after the candidate terminal is set successfully, cut off the call with the mobile terminal automatically and call the candidate terminal.

Furthermore, a telephone conference method is further provided according to an embodiment of the disclosure, which includes:

one or more terminal numbers corresponding to a user who is supposed to participate in a conference is acquired, and a terminal state corresponding to each of the one or more terminal numbers is acquired; and a terminal number which meets a requirement is selected from the one or more terminal numbers at beginning of conference establishment according to a preset routing principle and the terminal state corresponding to the each of the one or more terminal numbers, and a call is made to the selected terminal number.

In an embodiment of the disclosure, the terminal state corresponding to the each of the one or more terminal numbers may include at least one of followings: a power-on/power-off state of a mobile terminal, a roaming state of the mobile terminal, a registration location of a fixed telephone terminal, and a login/logout state of the fixed telephone terminal.

In an embodiment of the disclosure, the acquiring a terminal state corresponding to the each of the one or more terminal numbers may include:

the power-on/power-off state of the mobile terminal is obtained by interacting with an SSP of a bureau party;

the roaming state of the mobile terminal is obtained by interacting with an HLR of the bureau party; and the registration location and a login/logout state of the fixed telephone terminal is obtained by interacting with an SS point.

In an embodiment of the disclosure, the preset routing principle may refer to that the fixed telephone terminal has precedence over the mobile terminal and/or that a local terminal number has precedence over a roaming terminal number.

In an embodiment of the disclosure, the method may further include:

in the case the selected terminal number is a number of a mobile terminal and the mobile terminal is called through, a candidate terminal is further set according to a preset rule; and after the candidate terminal is set successfully, the call with the mobile terminal is cut off automatically and the candidate terminal is called.

The embodiments of the disclosure have the following beneficial effect:

a terminal number which meets a requirement from the one or more terminal numbers is selected to make a call according to a preset routing principle and a terminal state obtained by acquiring and corresponding to one or more terminal numbers of a user participating in a conference. Since one or more terminal numbers corresponding to the user participating in the conference exist, the success rate of connecting a terminal number corresponding to the user is increased to a certain degree, thereby ensuring that the user can successfully participate in a telephone conference to a certain degree.

DETAILED DESCRIPTION

The disclosure will be further elaborated below with reference to specific embodiments and the accompanying drawings.

Figure 1:
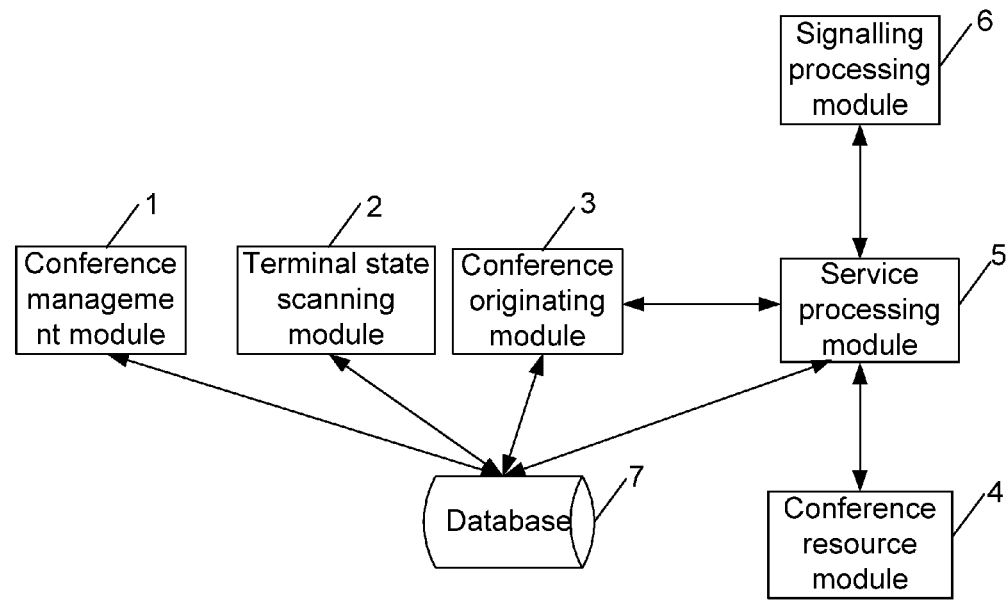
FIG. 1 is a schematic diagram illustrating composition of a telephone conference system in an embodiment of the disclosure.

Referring to FIG. 1, a telephone conference system in an embodiment of the disclosure includes a conference management module 1, a terminal state scanning module 2, a conference originating module 3, a service processing module 5, a signalling processing module 6 and a conference resource module 4. In addition, the telephone conference system may further include a database 7.

The conference management module 1 is configured to formulate conference information, designate a user participating in a conference and send information of the designated user participating in the conference to the database 7 to be stored.

It should be noted that the conference management module 1 designates a name, a badge number or the like of the user participating in the conference instead of designating a terminal number corresponding to the user participating in the conference. One or more terminal numbers corresponding to each of all users that are designated by the conference management module 1 and are able to participate in the conference is pre-stored in the database 7. It may also be understood that the user designated by the conference management module 1 who is supposed to participate in the conference is certainly included in users pre-stored in the database 7 to participate in the conference. The conference information may specifically include a conference task, a conference start time, and related control and management information during the conference.

It should be also noted that the database 7 may be in the telephone conference system in the embodiment of the disclosure, or may be independent and serves as a storage configured to store related information of the telephone conference system.

The terminal state scanning module 2 is configured to read, from the database 7, the user designated by the conference management module 1 who is supposed to participate in the conference, acquire a terminal number corresponding to the user, scan a terminal state corresponding to the terminal number, and store scanned information of the terminal state corresponding to the terminal number into the database 7.

The conference originating module 3 is configured to scan the conference information in the database 7 periodically, acquire the conference start time and a conference identifier, compare the acquired conference start time with the current time, and determine whether the conference start time expires. If it is determined by the conference originating module 3 that the conference start time expires, the conference originating module 3 notifies, according to the conference identifier, the service processing module 5 to start conference establishment.

The service processing module 5, which may be a Service Control Point (SCP), receives a message from the conference originating module 3 and starts the conference establishment. Specifically, the service processing module 5 inquires and acquires, through the conference identifier sent by the conference originating module 3, the user designated by the conference management module 1 who is supposed to participate in the conference, one or more terminal numbers corresponding to the user participating in the conference and a terminal state corresponding to the each of the one or more terminal numbers; and selects, according to a preset routing principle and the terminal state corresponding to the each of the one or more terminal numbers corresponding to the user, a terminal number which meets a requirement from the one or more terminal numbers, and a call is made to the selected terminal number to accordingly complete the conference establishment.

Specifically, during the process of calling one or more terminal numbers corresponding to a user, the service processing module 5 performs signalling interaction with the signalling processing module 6 to select a terminal number meeting a requirement to make the call while the signalling processing module 6 performs signalling interaction with an SSP of a bureau party, forwards a signalling processed by the service processing module 5 to the SSP to perform a user operation, and returns a processing result of the SSP to the service processing module 5.

At the same time, the service processing module 5 may further perform signalling interaction with the conference resource module 4 managing conference resources to apply for conference resources. Generally, the conference resource module 4 may be a media server configured to provide conference resources to the service processing module 5, perform conference recording and conference control during a conference, and release the conference resources after the conference is completed.

In the aforementioned telephone conference system, at the beginning of conference establishment, a terminal number meeting a requirement is selected, according to a preset routing principle and a scanned terminal state corresponding to one or more terminal numbers of a user participating in a conference, from the one or more terminal numbers, and a call is made to the selected terminal number to complete corresponding conference establishment. Since one or more terminal numbers corresponding to the user participating in the conference exist, there are more chances to select a terminal number meeting a requirement to make the corresponding call when terminal numbers meeting the requirement are selected, thus the success rate of connecting a terminal number corresponding to the user participating in the conference is increased, which ensures that the user can successfully participate in a telephone conference to a certain degree.

It should be noted that a terminal state information table may be established in the database 7, and the terminal state scanning module 2 may store a scanned terminal state corresponding to a terminal number into the terminal state information table.

It should be also noted that one or more terminal numbers corresponding to a user participating in the conference exist. A terminal corresponding to a terminal number may be a mobile terminal or a fixed telephone terminal. Since the terminal corresponding to the terminal number may be a mobile terminal or a fixed telephone terminal, the terminal number may correspond to a plurality of terminal states. For example, in an embodiment of the disclosure, when a terminal corresponding to a terminal number is a mobile terminal, terminal states corresponding to the terminal number include at least one of followings: a power-on/power-off state, and a roaming state. When a terminal corresponding to a terminal number is a fixed telephone terminal, terminal states corresponding to the terminal number include at least one of followings: a registration location, and a login/logout state.

It should be explained that a registration location state of a fixed telephone terminal is determined by a location where user registration information is located. If a registration location of a fixed telephone terminal corresponding to a terminal number is the same with a location where user registration information is located, it is indicated that the fixed telephone terminal is a local fixed telephone terminal and the terminal number is a local terminal number. If a registration location of a fixed telephone terminal corresponding to a terminal number is different from a location where user registration information is located, it is indicated that the fixed telephone terminal is a roaming fixed telephone terminal and the terminal number is a roaming terminal number. For example, if a location where registration information of a user participating in a conference stored in the database 7 is located belongs to Shenzhen area, and a registration location of a fixed telephone terminal corresponding to a terminal number of the user stored in the database also belongs to the Shenzhen area, then it is indicated that the fixed telephone terminal is a local fixed telephone terminal and the terminal number is a local terminal number. Likewise, a roaming state of a mobile terminal is also determined by a location where user registration information is located. A registration location of a mobile terminal is the same with a location where user registration information by default. If a location of a current mobile terminal is inconsistent with a location where user registration information is located, then it is indicated that the mobile terminal is roaming. In an embodiment of the disclosure, when a mobile terminal is roaming, a terminal number corresponding to the mobile terminal is referred to as a roaming terminal number. If the mobile terminal does not roam, then the terminal number corresponding to the mobile terminal is a local terminal number.

Figure 2:
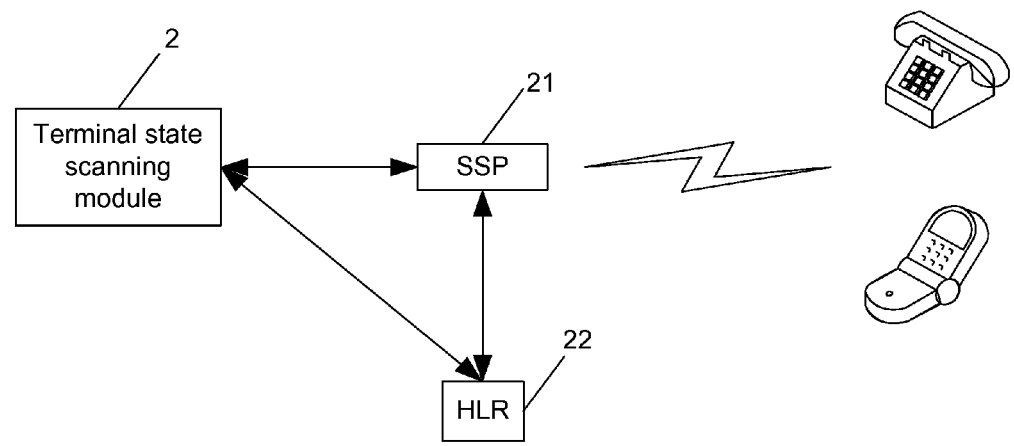
FIG. 2 is a schematic diagram illustrating connection of a terminal state scanning module and a bureau party in another embodiment of the disclosure.

As shown in FIG. 2, in an embodiment of the disclosure, the terminal state scanning module 2 may specifically acquire terminal states corresponding to terminal numbers corresponding to a user in the database 7 by the following ways.

If a terminal corresponding to a terminal number is a mobile terminal, then the terminal state scanning module 2 may connect an SSP 21 of a bureau party and an HLR 22 respectively through winnttcp to query a terminal state of the mobile terminal. Specifically, the terminal state scanning module 2 sends a power-on registration indication message to the SSP 21. After the power-on registration indication message is received by the SSP 21 from the terminal state scanning module 2, the SSP 21 sends a location update message (REGNOT) to the HLR 22 to which the mobile terminal belongs. After a location update operation is completed by the HLR 22, the HLR 22 returns a response message (regnot) to the SSP 21. After the response message is received by the SSP 21, the SSP 21 forwards the received response message to the terminal state scanning module 2. In this way, the terminal state scanning module 2 can know whether the terminal state of the mobile terminal is a power-on state. And, the terminal state scanning module 2 determines, by sending a roaming power-on state query to the HLR 22, a roaming state of the mobile terminal according to information returned by the HLR 22. Specifically, the HLR 22 may determine whether the mobile terminal is in the roaming state according to current location information of the mobile terminal.

If a terminal corresponding to a terminal number is a fixed telephone terminal and the fixed telephone terminal is a sipphone or a softphone, the terminal state scanning module 2 can determine, by sending a login query message to an SSP, a login/logout state and a registration location of the fixed telephone terminal according to a login state message returned by the SSP. If the fixed telephone terminal is another kind of fixed telephone, such as a Public Switched Telephone Network (PSTN) user terminal, the terminal state scanning module 2 considers the terminal state of the fixed telephone terminal as a login state by default without connecting a switch.

Figure 3:
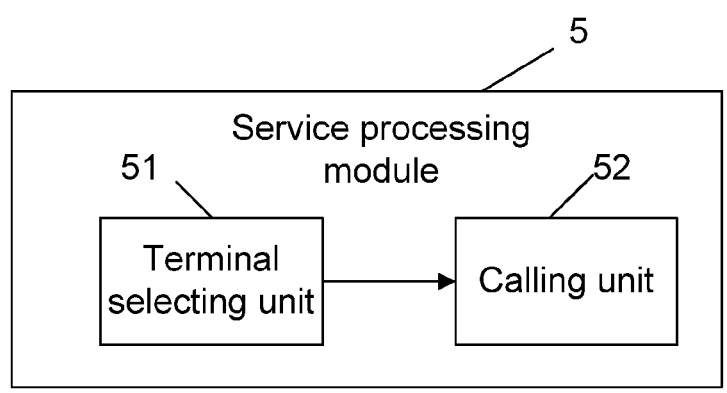
FIG. 3 is a schematic diagram illustrating composition of a service processing module in an embodiment of the disclosure.

As shown in FIG. 3, in an embodiment of the disclosure, the service processing module 5 includes a terminal selecting unit 51 and a calling unit 52. After the conference management module 1 completes establishment of conference information, the terminal state scanning module 2 completes scanning of terminal numbers corresponding to a user and the conference originating module 3 determines that a conference start time expires, the terminal selecting unit 51 of the service processing module 5 will select, according to a preset routing principle and a terminal state corresponding to a terminal number stored in the database 7, a terminal number meeting a requirement while the calling unit 52 is configured to call the selected terminal number meeting the requirement. Here, the preset routing principle is specifically that a fixed telephone terminal has precedence over a mobile terminal and/or that a local terminal number has precedence over a roaming terminal number.

Figure 4:
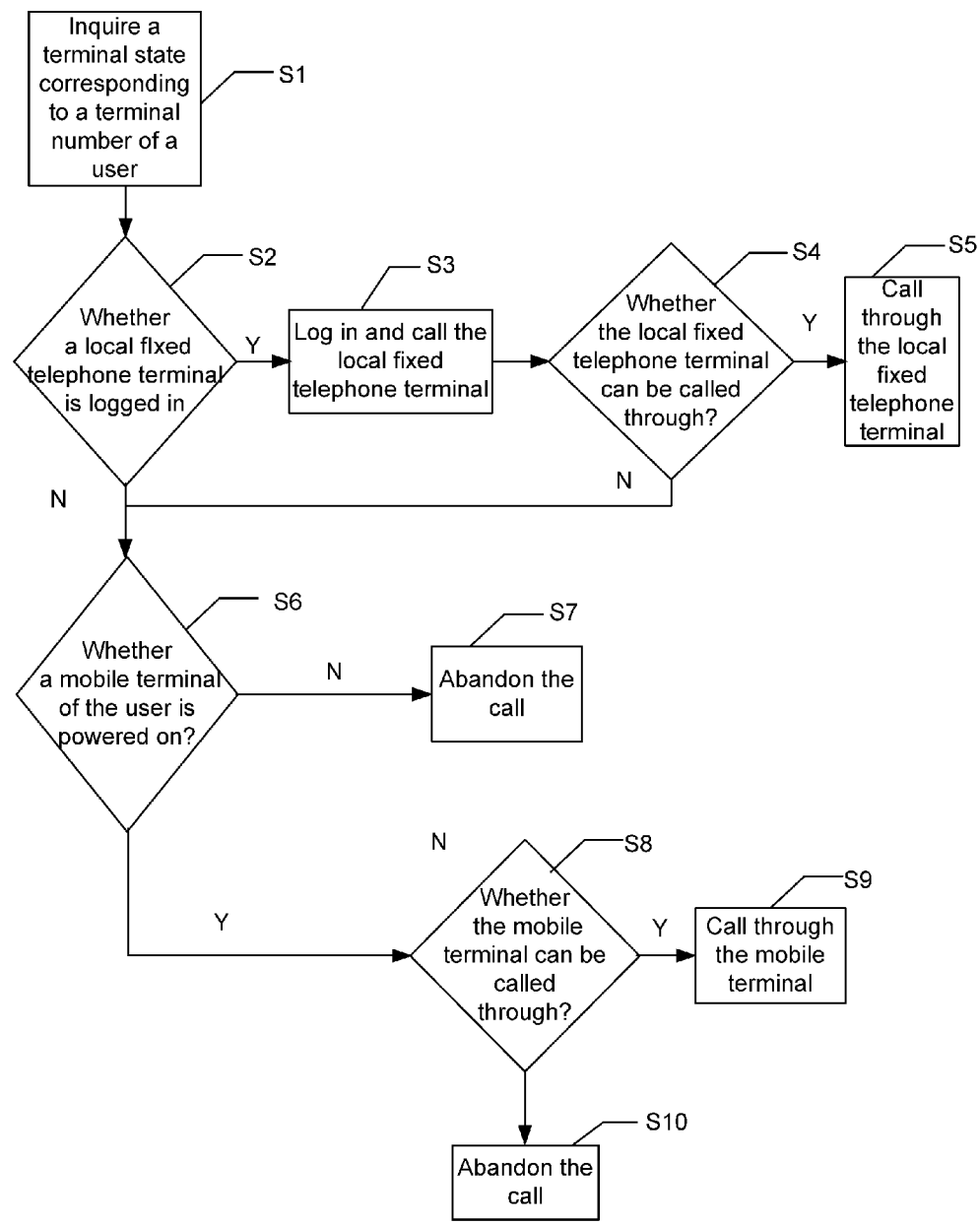
FIG. 4 is a flowchart of calling a terminal number in a first embodiment of the disclosure.

As shown in FIG. 4, in a first embodiment, if terminals corresponding to terminal numbers include a mobile terminal and a local fixed telephone terminal, the service processing module selects, according to a user designated in a database and terminal numbers corresponding to the user, a terminal number meeting a requirement from the terminal numbers to make a call by the following way:

S1: the terminal selecting unit inquires a terminal state information table of the database for terminal states corresponding to the terminal numbers corresponding to the user;

S2: the terminal selecting unit inquires whether the terminal state of the local fixed telephone terminal is a login state; if yes, S3 is executed; otherwise, S6 is executed;

S3: if the terminal state of the local fixed telephone terminal is the login state, the calling unit calls a terminal number corresponding to the local fixed telephone terminal first;

S4: it is determined whether the local fixed telephone terminal can be connected; if yes, S5 is executed; otherwise, S6 is executed;

S5: the local fixed telephone terminal is called through and the user is added to the conference successfully;

S6: when the local fixed telephone terminal is not in the login state or the local fixed telephone terminal cannot still be connected after being called for several times (such as three times), the terminal selecting unit then inquires whether the mobile terminal corresponding to a terminal number is in a power-on state; if no, S7 is executed; otherwise, S8 is executed;

S7: if the terminal state of the mobile terminal is in a power-off state, the calling unit abandons the call directly;

S8: if the terminal state of the mobile terminal is in the power-on state, the calling unit calls the mobile terminal directly and determines whether the mobile terminal can be connected, and does not need to query a roaming state of the mobile terminal at the moment; if the mobile terminal can be connected, S9 is executed; otherwise, S10 is executed;

S9: the mobile terminal is called through and the user is added to the conference successfully; and S10: if the mobile terminal cannot still be connected after being called for several times, the calling unit abandons the call.

Figure 5:
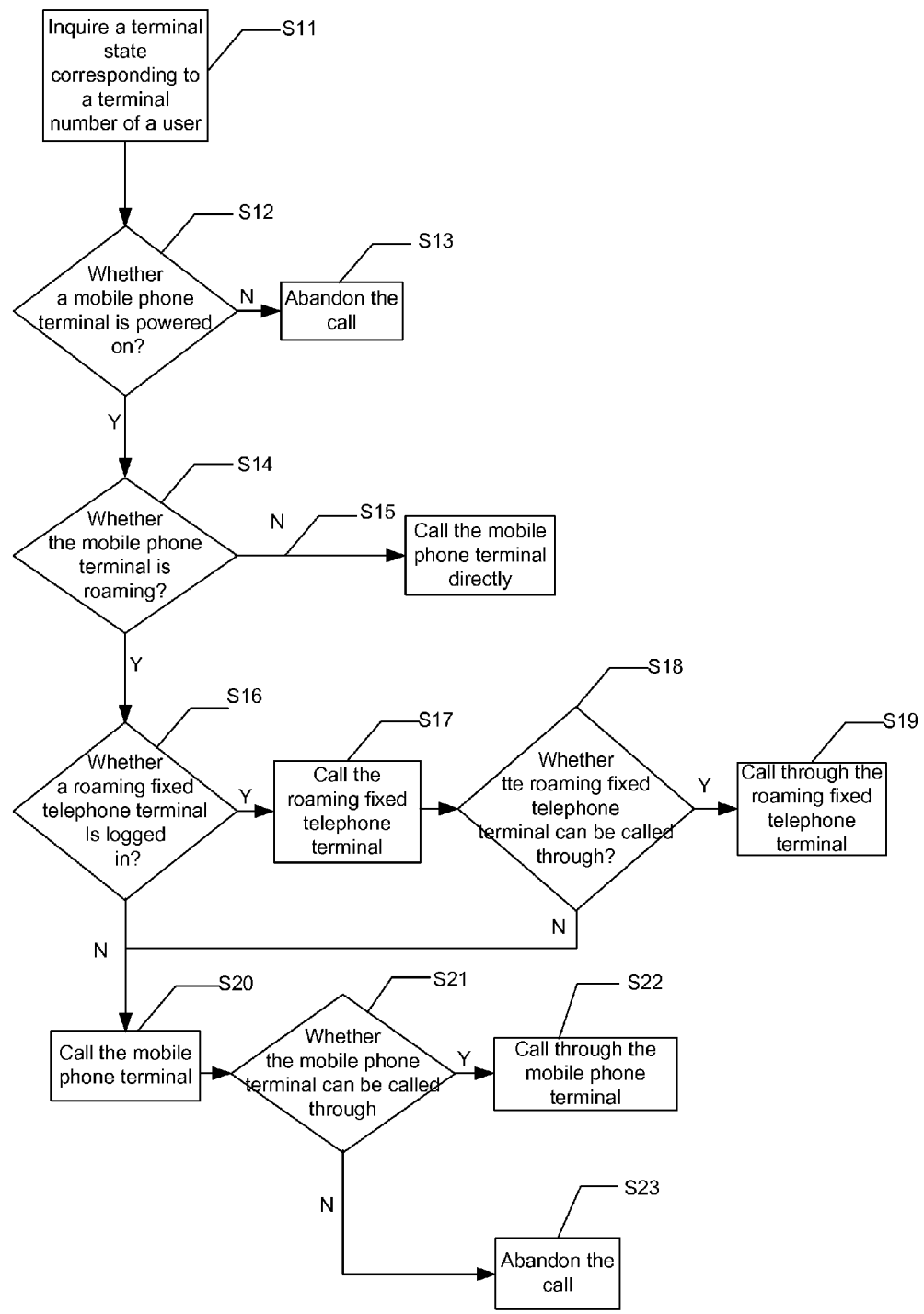
FIG. 5 is a flowchart of calling a terminal number in a second embodiment of the disclosure.

As shown in FIG. 5, in a second embodiment, if terminals corresponding to terminal numbers of a user include a mobile phone terminal and a roaming fixed telephone terminal, the service processing module selects, according to a user designated in a database and terminal numbers corresponding to the user, a terminal number meeting a requirement from the terminal numbers to make a call by the following way:

S11: the terminal selecting unit inquires a terminal state information table of the database for terminal states corresponding to the terminal numbers corresponding to the user;

S12: the terminal selecting unit first inquires whether the mobile phone terminal is in a power-on state; if no, S13 is executed; otherwise, S14 is executed;

S13: if the mobile phone terminal is in a power-off state, the calling unit abandons the call directly;

S14: if the mobile phone terminal is in the power-on state, the terminal selecting unit inquires whether the mobile phone terminal is in a roaming state; if yes, S15 is executed; otherwise, S16 is executed;

S15: if the mobile phone terminal is not in the roaming state, the calling unit calls the mobile phone terminal directly;

S16: if the mobile phone terminal is in the roaming state, the terminal selecting unit inquires whether the terminal state of the roaming fixed telephone terminal is a login state; if yes, S17 is executed; otherwise, S20 is executed;

S17: if the roaming fixed telephone terminal is in the login state, the calling unit calls the roaming fixed telephone terminal; and S18 is executed;

S18: it is determined whether the roaming fixed telephone terminal can be connected; if yes, S19 is executed; otherwise, S20 is executed;

S19: the roaming fixed telephone terminal is called through, and the user is added to the conference successfully;

S20: when the roaming fixed telephone terminal is not in the login state or the roaming fixed telephone terminal cannot still be connected after being called for many times (such as three times), the calling unit calls the mobile phone terminal over again;

S21: it is determined whether the mobile phone terminal can be connected; if yes, S22 is executed; otherwise, S23 is executed;

S22: the mobile phone terminal is called through and the user is added to the conference successfully; and S23: if the mobile phone terminal cannot still be connected after being called for many times, the calling unit abandons the call.

Figure 6:
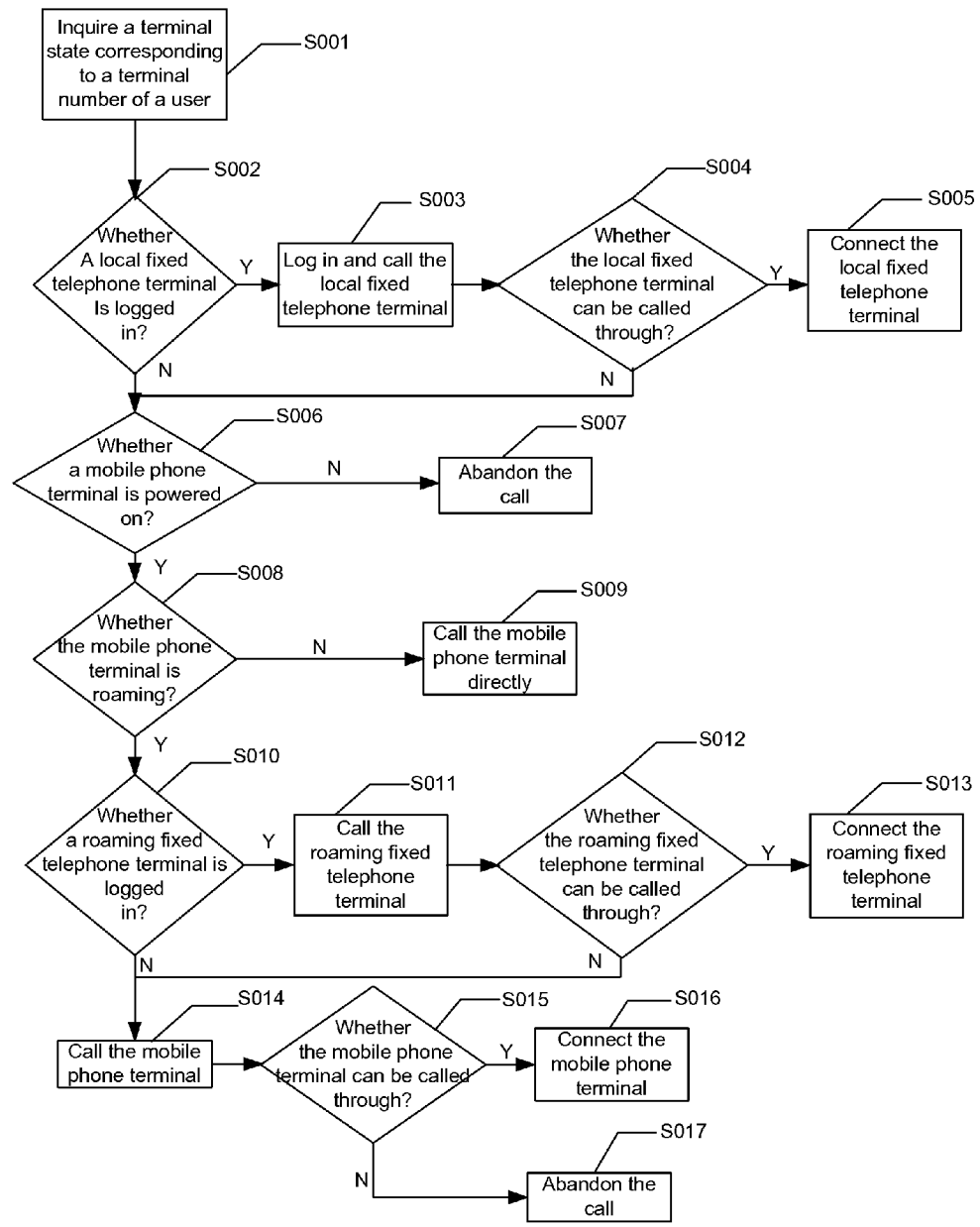
FIG. 6 is a flowchart of calling a terminal number in a third embodiment of the disclosure.

As shown in FIG. 6, in a third embodiment, if terminals corresponding to terminal numbers corresponding to a user include a mobile phone terminal, a local fixed telephone terminal and a roaming fixed telephone terminal, the service processing module selects, according to a user designated in a database and terminal numbers corresponding to the user, a terminal number meeting a requirement from the terminal numbers to make a call by the following way:

S001: the terminal selecting unit inquires a terminal state information table of the database for a terminal state corresponding to each of the terminal numbers corresponding to the user first;

S002: the terminal selecting unit first inquires whether the local fixed telephone terminal is in a login state; if yes, S003 is executed; otherwise, S006 is executed;

S003: if the local fixed telephone terminal is in the login state, the calling unit calls the local fixed telephone terminal first;

S004: it is determined whether the fixed telephone terminal can be connected; if yes, S005 is executed; otherwise, S006 is executed;

S005: the local fixed telephone terminal is called through and the user is added to the conference successfully;

S006: when the local fixed telephone terminal is not in the login state or the local fixed telephone terminal cannot still be connected after being called for several times (such as three times), the terminal selecting units inquires whether the mobile phone terminal is in a power-on state; if no, S007 is executed; otherwise, S008 is executed;

S007: if the mobile phone terminal is in a power-off state, the calling unit abandons the call directly;

S008: if the mobile phone terminal is in the power-on state, the terminal selecting unit inquires whether the mobile phone terminal is in a roaming state; if no, S009 is executed; otherwise, S010 is executed;

S009: if the mobile phone terminal is not in the roaming state, the calling unit calls the mobile phone terminal directly;

S010: if the mobile phone terminal is in the roaming state, the terminal selecting unit inquires whether the roaming fixed telephone terminal is in a login state; if yes, S011 is executed; otherwise, S014 is executed;

S011: if the roaming fixed telephone terminal is in the login state, the calling unit calls the roaming fixed telephone terminal;

S012: it is determined whether the roaming fixed telephone terminal can be connected; if yes, S013 is executed; otherwise, S014 is executed;

S013: the roaming fixed telephone terminal is called through and the user is added to the conference directly;

S014: when the roaming fixed telephone terminal is not in the login state or the roaming fixed telephone terminal cannot still be connected after being called for many times (such as three times), the calling unit calls the mobile phone terminal over again;

S015: it is determined whether the mobile phone terminal can be connected; if yes, S016 is executed; otherwise, S017 is executed;

S016: the mobile phone terminal is called through and the user is added to the conference successfully; and S017: if the mobile phone terminal cannot still be connected after being called for many times, the calling unit abandons the call.

Different routing strategies are applied to different combination conditions of terminal numbers, so that an appropriate terminal number can be selected to make a call according to actual conditions of a user. Since the aforementioned routing strategies are formulated according to the actual conditions and actual demands of the user, the success rate of connecting a terminal number corresponding to the user is increased while problems including radiation caused by a mobile phone terminal to the user, heating and overheating caused by using the mobile phone for a long period of time, and the like can be reduced as much as possible, thus satisfying demands of the user to the greatest extent. In addition, when the mobile phone terminal of the user is in a roaming state, the mobile phone terminal can be replaced by a roaming fixed telephone terminal to hold a telephone conference, so that a lot of mobile phone roaming cost can reduced for the user, thus improving use satisfaction of the user and user experience.

In an embodiment of the disclosure, the telephone conference system further includes a setting module. After the service processing module connects a mobile terminal successfully, a user may set a candidate terminal according to a preset rule. After the candidate terminal is set successfully, the service processing module of the telephone conference system will cut off the call with the mobile terminal automatically, and calls the candidate terminal. If the candidate terminal cannot be connected after being called for many times, the service processing module of the telephone conference system will call the mobile terminal over again. Therefore, it can be ensured that the telephone conference can be held normally, and radiation of a mobile terminal such as a mobile phone to the user can also be reduced as much as possible. Furthermore, a lot of mobile phone cost can also be reduced and actual demands of the user is thus satisfied to the greatest extent. Here, the set candidate terminal may be a fixed telephone terminal or may be also a mobile terminal.

At the same time, an embodiment of the disclosure further provides a telephone conference method, which includes the following steps:

one or more terminal numbers corresponding to a user participating in a conference is acquired, and a terminal state corresponding to each of the one or more terminal numbers is scanned; and a terminal number which meets a requirement is selected from the one or more terminal numbers at the beginning of conference establishment according to a preset routing principle and the terminal state corresponding to the each of the one or more terminal numbers, and a call is made to the selected terminal number.

In an embodiment of the disclosure, the step of calling, according to a preset routing principle and a terminal state corresponding to a terminal number, the terminal number corresponding to a respective user includes:

if terminals corresponding to terminal numbers to which a user identifier corresponds include a mobile phone terminal and a local fixed telephone terminal, it is first inquired whether the local fixed telephone terminal is in a login state; if the local fixed telephone terminal is in the login state, the local fixed telephone terminal is called first; and when the local fixed telephone terminal cannot be connected, it is then inquired whether the mobile phone terminal is in a power-on state; if the mobile phone terminal is in a power-off state, the call is abandoned directly; if the mobile phone terminal is in the power-on state, the mobile phone terminal is called.

If terminals corresponding to terminal numbers of a user include a mobile phone terminal and a roaming fixed telephone terminal, a power-on/power-off state of the mobile phone terminal is inquired first; if the mobile phone terminal is in the power-off state, the call is abandoned directly; if the mobile phone terminal is in the power-on state, it is then inquired whether the mobile phone terminal is in a roaming state; if the mobile phone terminal is not in the roaming state, the mobile phone is called directly; if the mobile phone terminal is in the roaming state, it is inquired whether the roaming fixed telephone terminal is in a login state; if the roaming fixed telephone terminal is in the login state, the roaming fixed telephone terminal is called, and when the roaming fixed telephone terminal cannot be connected, the mobile phone terminal is then called.

If terminals corresponding to terminal numbers to which a user corresponds include a mobile terminal, a local fixed telephone terminal and a roaming fixed telephone terminal, it is first inquired whether the local fixed telephone terminal is in a login state; if the local fixed telephone terminal is in the login state, the local fixed telephone terminal is called; and when the local fixed telephone terminal cannot be connected, a power-on/power-off state of the mobile phone terminal is then inquired; if the mobile phone terminal is in the power-off state, the call is abandoned directly; if the mobile phone terminal is in the power-on state, it is then inquired whether the mobile phone terminal is in a roaming state; if the mobile phone terminal is not in the roaming state, the mobile phone is called directly; if the mobile phone terminal is in the roaming state, then it is inquired whether the roaming fixed telephone terminal is in a login state; if the roaming fixed telephone terminal is in the login state, the roaming fixed telephone terminal is called, and when the roaming fixed telephone terminal cannot be connected, the mobile phone terminal is then called.

In an embodiment of the disclosure, the method may further include:

after a mobile terminal is called through, a candidate terminal is further set according to a preset rule; after the candidate terminal is set successfully, the call is cut off with the mobile terminal automatically and the candidate terminal is called. Specifically, after a service processing module calls the mobile terminal successfully, a user can set the candidate terminal according to the preset rule during the call. After the candidate terminal is set successfully, the service processing module of a telephone conference system will cut off the call with the mobile terminal automatically and call the candidate terminal. If the candidate terminal cannot be connected after being called for many times, the service processing module of the telephone conference system will call the mobile phone over again.

The above are further detailed descriptions of the disclosure made in conjunction with specific embodiments, but the specific embodiments of the disclosure shall not be deemed as merely being limited to these descriptions. For those ordinary skilled in the art, several simple deductions or replacements may be further made without departing from the concept of the disclosure, which shall be deemed as belonging to the scope of protection of the claims of the disclosure.

The invention claimed is:

1. A telephone conference system, comprising:
a conference manager, a memory, a terminal state scanner and a service control point (SCP);
wherein the conference manager is configured to designate users who are supposed to participate in a conference, wherein a name or a badge number of a user is designated;
the memory is configured to store one or more terminal numbers corresponding to each of the users designated, and store a terminal state corresponding to each of the one or more terminal numbers which is scanned by the terminal state scanner;
the terminal state scanner is configured to acquire one or more terminal numbers corresponding to a user who is supposed to participate in the conference from the memory, and scan the terminal state corresponding to each of the one or more terminal numbers; and
the SCP is configured to select at beginning of conference establishment, according to a preset routing principle and the terminal state corresponding to the each of the one or more terminal numbers in the memory, a terminal number which meets a requirement from the one or more terminal numbers, and make a call to the selected terminal number.

2. The system according to claim 1, wherein the terminal state corresponding to the each of the one or more terminal numbers comprises at least one of followings: a power-on/power-off state of a mobile terminal, a roaming state of the mobile terminal, a registration location of a fixed telephone terminal, and a login/logout state of the fixed telephone terminal.

3. The system according to claim 2, wherein the terminal state scanner is configured to: interact with a Service Switching Point (SSP) of a bureau party to obtain the power-on/power-off state of the mobile terminal;
interact with a Home Location Register (HLR) of the bureau party to obtain the roaming state of the mobile terminal; and
interact with a Soft Switching Point (SSP) to obtain the registration location and the login/logout state of the fixed telephone terminal.

4. The system according to claim 3, further comprising a setter configured to, in the case the selected terminal number is a number of a mobile terminal and the mobile terminal is called through, set a candidate terminal according to a preset rule, wherein the SCP is further configured to, after the candidate terminal is set successfully, cut off the call with the mobile terminal automatically and call the candidate terminal.

5. The system according to claim 2,
wherein the preset routing principle refers to that the fixed telephone terminal has precedence over the mobile terminal and/or that a local terminal number has precedence over a roaming terminal number.

6. The system according to claim 5, further comprising a setter configured to, in the case the selected terminal number is a number of a mobile terminal and the mobile terminal is called through, set a candidate terminal according to a preset rule, wherein the SCP is further configured to, after the candidate terminal is set successfully, cut off the call with the mobile terminal automatically and call the candidate terminal.

7. The system according to claim 2, further comprising a setter configured to, in the case the selected terminal number is a number of a mobile terminal and the mobile terminal is called through, set a candidate terminal according to a preset rule, wherein the SCP is further configured to, after the candidate terminal is set successfully, cut off the call with the mobile terminal automatically and call the candidate terminal.

8. The system according to claim 1, further comprising a setter setting module configured to, in the case the selected terminal number is a number of a mobile terminal and the mobile terminal is called through, set a candidate terminal according to a preset rule, wherein the SCP is further configured to, after the candidate terminal is set successfully, cut off the call with the mobile terminal automatically and call the candidate terminal.

9. A telephone conference method, comprising:
designating, by a conference manager, users who are supposed to participate in a conference, wherein a name or a badge number of a user is designated;
storing, by a memory, one or more terminal numbers corresponding to each of the users designated;
acquiring, by a terminal state scanner, one or more terminal numbers corresponding to a user who is supposed to participate in a conference, scanning a terminal state corresponding to each of the one or more terminal numbers and storing the terminal state corresponding to each of the one or more
terminal numbers; and
selecting, by a service control point (SCP), at beginning of conference establishment, according to a preset routing principle and the stored terminal state corresponding to the each of the one or more terminal numbers, a terminal number which meets a requirement from the one or more terminal numbers, and making, by the SCP, a call to the selected terminal number.

10. The method according to claim 9, wherein the terminal state corresponding to the each of the one or more terminal numbers comprises at least one of followings: a power-on/power-off state of a mobile terminal, a roaming state of the mobile terminal, a registration location of a fixed telephone terminal, and a login/logout state of the fixed telephone terminal.

11. The method according to claim 10, further comprising:
in the case the selected terminal number is a number of a mobile terminal and the mobile terminal is called through, setting, by a setter, a candidate terminal according to a preset rule; and after the candidate terminal is set successfully, cutting off, by the SCP, the call with the mobile terminal automatically and calling the candidate terminal.

12. The method according to claim 9, wherein the scanning a terminal state corresponding to the each of the one or more terminal numbers comprises:

interacting, by the terminal state scanner, with a Service Switching Point (SSP) of a bureau party to obtain the power-on/power-off state of the mobile terminal;

interacting, by the terminal state scanner, with a Home Location Register (HLR) of the bureau party to obtain the roaming state of the mobile terminal; and interacting, by the terminal state scanner, with a Soft Switching Point (SSP) to obtain the registration location and the login/logout state of the fixed telephone terminal.

13. The method according to claim 12, further comprising:

in the case the selected terminal number is a number of a mobile terminal and the mobile terminal is called through, setting, by a setter, a candidate terminal according to a preset rule; and after the candidate terminal is set successfully, cutting off, by the SCP, the call with the mobile terminal automatically and calling the candidate terminal.

14. The method according to claim 9, wherein the preset routing principle refers to that the fixed telephone terminal has precedence over the mobile terminal and/or that a local terminal number has precedence over a roaming terminal number.

15. The method according to claim 9, further comprising:

in the case the selected terminal number is a number of a mobile terminal and the mobile terminal is called through, setting, by a setter, a candidate terminal according to a preset rule; and after the candidate terminal is set successfully, cutting off, by the SCP, the call with the mobile terminal automatically and calling the candidate terminal.

* * * * *